United States Patent
Song (10) Patent No.: US 11,226,017 B2
(45) Date of Patent: Jan. 18, 2022

(54) ENGINE CLUTCH DISENGAGEMENT CONTROL METHOD FOR HYBRID ELECTRIC VEHICLE

(71) Applicants: HYUNDAI MOTOR COMPANY, Seoul (KR); KIA MOTORS CORPORATION, Seoul (KR)

(72) Inventor: Jun Geol Song, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/007,841

(22) Filed: Aug. 31, 2020

(65) Prior Publication Data

US 2021/0079962 A1    Mar. 18, 2021

(30) Foreign Application Priority Data

Sep. 16, 2019 (KR) .......... 10-2019-0113260

(51) Int. Cl.
*B60K 6/387* (2007.10)
*F16D 48/06* (2006.01)

(52) U.S. Cl.
CPC .......... *F16D 48/06* (2013.01); *B60K 6/387* (2013.01); *B60Y 2200/92* (2013.01);
(Continued)

(58) Field of Classification Search
CPC .......... F16D 48/06; F16D 2500/10412; F16D 2500/30406; F16D 2500/3065;
(Continued)

(56) References Cited

U.S. PATENT DOCUMENTS 5,679,099 A * 10/1997 Kato ............... F16D 48/066 477/176
2004/0210374 A1 * 10/2004 Werner ............ F16D 48/06 701/67

(Continued)

*Primary Examiner* — Tisha D Lewis
(74) *Attorney, Agent, or Firm* — Lempia Summerfield Katz LLC (57) ABSTRACT

An engine clutch disengagement control method for a hybrid electric vehicle is disclosed to overcome a sense of discontinuous travel caused when an engine clutch is disengaged due to influence of the inaccuracy of model engine torque. The method includes: acquiring vehicle acceleration information during engine clutch disengagement control of the hybrid electric vehicle, determining whether a predetermined condition for determining inaccuracy of model engine torque required for engine clutch disengagement control is satisfied from the acquired vehicle acceleration information, when the predetermined condition is satisfied, determining a situation in which the model engine torque is inaccurate and calculating target compensation torque using the vehicle acceleration information, calculating a target slippage amount in a transmission clutch using the calculated target compensation torque, and performing transmission clutch torque control for inducing slippage in a transmission clutch based on the target slippage amount and a current transmission speed.

10 Claims, 5 Drawing Sheets

(52) U.S. Cl.
CPC . *B60Y 2300/42* (2013.01); *F16D 2500/10412* (2013.01); *F16D 2500/3065* (2013.01); *F16D 2500/30406* (2013.01); *F16D 2500/30816* (2013.01); *F16D 2500/3107* (2013.01); *F16D 2500/3109* (2013.01); *F16D 2500/3125* (2013.01); *F16D 2500/3144* (2013.01); *F16D 2500/3165* (2013.01)

(58) Field of Classification Search
CPC ... F16D 2500/30816; F16D 2500/3107; F16D 2500/3109; F16D 2500/3125; F16D 2500/3144; F16D 2500/3165; B60K 6/387; B60Y 2200/92; B60Y 2300/42
See application file for complete search history.

(56) References Cited

U.S. PATENT DOCUMENTS

| | | | |
|---|---|---|---|
| 2007/0056784 A1* | 3/2007 | Joe | B60W 20/30 180/65.245 |
| 2011/0098895 A1* | 4/2011 | Marcigliano | B60W 50/0098 701/54 |

* cited by examiner

ENGINE CLUTCH DISENGAGEMENT CONTROL METHOD FOR HYBRID ELECTRIC VEHICLE

CROSS-REFERENCE TO RELATED APPLICATION

This application claims priority to and the benefit of Korean Patent Application No. 10-2019-0113260, filed on Sep. 16, 2019, the entire contents of which are incorporated herein by reference.

FIELD

The present disclosure relates to an engine clutch disengagement control method for a hybrid electric vehicle.

BACKGROUND

The statements in this section merely provide background information related to the present disclosure and may not constitute prior art.

A hybrid electric vehicle is a vehicle using different types of driving sources, and in general, refers to a vehicle driven by an internal combustion engine (ICE) and an electric motor.

The hybrid electric vehicle of a hybrid electric vehicle is capable of being maximized by harmoniously operating an engine and a motor while traveling.

The hybrid electric vehicle includes a driving system with various configurations, and in this regard, a transmission mounted electric device (TMED) hybrid system, configured by connecting an engine and a motor via an engine clutch and connecting a transmission to an output side of the motor, has been known.

In a general hybrid electric vehicle, engine clutch disengagement control may be performed under cooperative control of controllers such as a hybrid control unit (HCU), which is a high-ranking is disengaged controller, an engine management system (EMS), a transmission control unit (TCU), or a motor control unit (MCU).

During engine clutch disengagement control, the engine management system (EMS) transfers engine torque information required for engine clutch disengagement control to the hybrid control unit (HCU), and engine torque (model engine torque) is determined using a prediction value obtained via mapping and modeling based on a fuel level, air content, ignition timing, or the like and is transferred.

In this case, engine torque is modeled in further consideration of environmental factors, but it is not physically possible to accurately model actual torque based on the environmental factor in a section in which torque is changed.

Thus, when an error with actual torque occurs in a procedure of reducing engine torque for disengaging an engine clutch, that is, when an error between actual engine torque and model engine torque occurs, a sense of discontinuous travel is caused in a vehicle.

Figure 2:
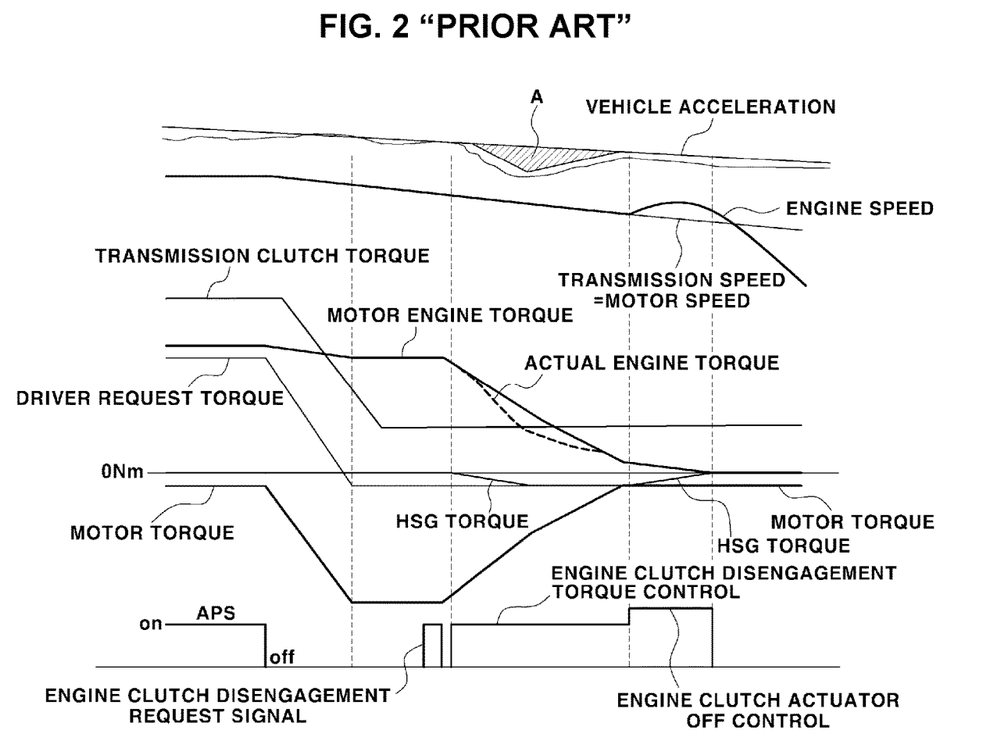
FIG. 2 is a line diagram showing a torque state of a conventional engine clutch disengagement control procedure.

FIG. 2 is a line diagram showing a torque state of a conventional engine clutch disengagement control procedure, and a description is given with reference to the drawing.

In FIG. 2, APS on/off indicates an accelerator pedal state and is obtained from a signal of an accelerator position sensor, APS off indicates the state in which a driver takes their foot off an accelerator pedal, and APS on indicates the state in which the driver depresses the accelerator pedal.

In the case of a TMED hybrid system, in FIG. 2, a transmission speed (a rotation speed of an input shaft of a transmission, that is, an input speed of the transmission) may be equal to a motor speed.

As shown in FIG. 2, when an engine clutch disengagement request signal is input after APS off timing, a hybrid controller controls torque input to an engine clutch in order to smoothly disengage the engine clutch.

In this case, control is performed to make the sum of engine torque, HSG torque for turning on an engine, and motor torque for driving a vehicle satisfy driver request torque until a predetermined torque is reached in consideration of inertial energy of the engine and the engine clutch.

Driver request torque may be lowered after APS off, and then, during torque control for disengaging an engine clutch, torque control may be performed to make the sum of model engine torque, HSG torque, and motor torque for driving a vehicle satisfy driver request torque while engine torque input to the engine clutch, that is, the model engine torque in FIG. 2 is gradually reduced.

However, during torque control on the engine and the motor for disengaging an engine clutch, when actual engine torque is insufficient based on a comparison with torque modeled by an engine controller, that is, model engine torque, torque input to a transmission is insufficient, and thus a driver may experience jerking or vehicle tugging.

FIG. 2 shows the case in which an error between actual engine torque and model engine torque occurs during torque control for disengaging an engine clutch.

In this case, it may be seen that acceleration of the vehicle is momentarily reduced and increased, and in this section (section 'A'), the driver experiences jerking or vehicle tugging.

In FIG. 2, when torque transferred to the engine clutch is lowered to a predetermined level, an engine clutch actuator is controlled to be moved in a direction in which a clutch is disengaged, and the engine clutch is completely disengaged through such engine clutch actuator off control, and thus travel in an EV mode may be possible.

As seen from FIG. 2, in a section (a section for engine clutch actuator off control) in which the engine clutch actuator is controlled in a direction in which the clutch is disengaged, an engine speed (engine RPM) increases temporarily.

SUMMARY

The present disclosure provides an engine clutch disengagement control method for a hybrid electric vehicle for overcoming a sense of discontinuous travel caused when an engine clutch is disengaged due to the influence of the inaccuracy of model engine torque.

In one form, an engine clutch disengagement control method for a hybrid electric vehicle includes: acquiring vehicle acceleration information during an engine clutch disengagement control of the hybrid electric vehicle, by a controller; determining whether a predetermined condition for determining inaccuracy of a model engine torque required for engine clutch disengagement control is satisfied based on the acquired vehicle acceleration information, by the controller; when the predetermined condition is satisfied, determining a situation in which the model engine torque is inaccurate and calculating a target compensation torque using the vehicle acceleration information, by the controller; calculating a target slippage amount in a transmission clutch using the calculated target compensation torque, by the controller; and performing a transmission clutch torque control for inducing slippage in a transmission clutch based on the target slippage amount and a current transmission speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so that those of ordinary skill in the art may easily implement the same with reference to the accompanying drawings. However, the present disclosure may be implemented in various different forms, and is not limited to these forms.

Throughout the present disclosure, when a certain part "includes" a certain component, this indicates that the part may further include other components, rather than excluding other components, unless there is no disclosure otherwise.

The present disclosure provides an engine clutch disengagement control method for a hybrid electric vehicle for overcoming a sense of discontinuous travel that is caused during engine clutch disengagement for mode switching (i.e., switching from a hybrid electric vehicle (HEV) mode to an electric vehicle (EV) mode) due to influence of the inaccuracy of modeled engine torque (i.e., model engine torque).

To this end, the present disclosure may overcome problems, which arise during conventional engine clutch disengagement control, using the dynamic property of a transmission clutch, in which case newly added transmission clutch torque control for inducing transmission clutch slippage as well as known engine and motor (hybrid starter and generator (HSG) and driving motor) torque control for disengaging an engine clutch is performed.

In the following description, the configuration of a hybrid system including an engine, an engine clutch, a motor, a transmission, an HSG, an inverter, and a battery will be described with reference to FIG. 1.

Figure 1:
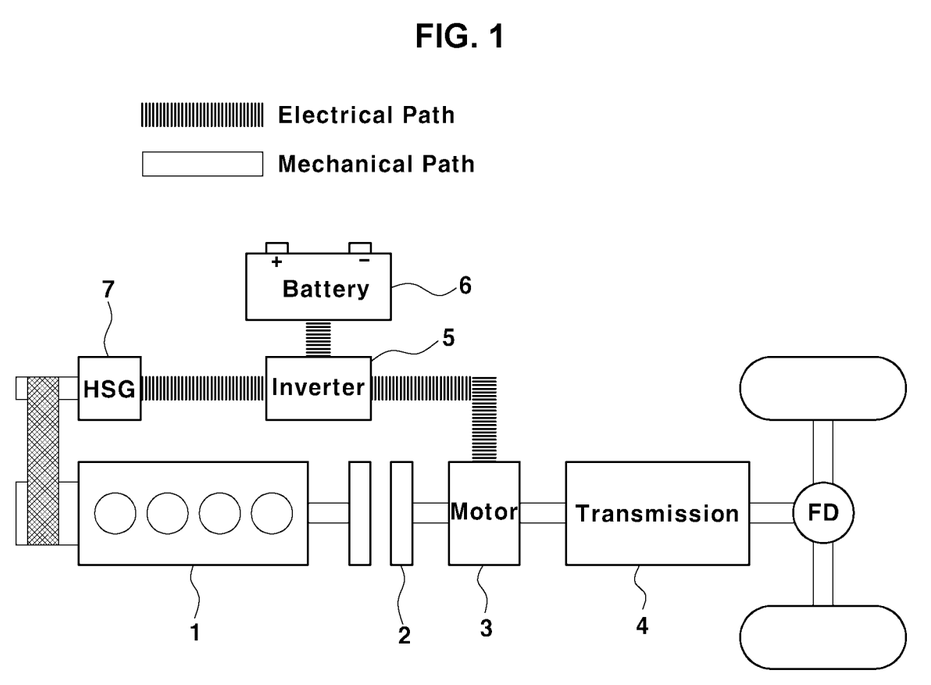
FIG. 1 is a diagram showing an example of the configuration of a powertrain of a hybrid electric vehicle.

FIG. 1 is a diagram showing an example of the configuration of a powertrain of a hybrid electric vehicle, and shows the configuration of a powertrain in which a motor 3 and a transmission 4 are connected.

As shown in the drawing, in the TMED hybrid system, the transmission 4 is installed at an output side of the motor 3 for driving a vehicle, and an output shaft of the motor is connected to an input shaft of the transmission, and thus a motor speed may be a transmission speed (a rotation speed of the input shaft of the transmission, that is, an input speed of the transmission).

The configuration of the TMED hybrid system is now described. The TMED hybrid system includes an engine 1 and the motor 3, each of which is a driving source for driving a vehicle, an engine clutch 2 interposed between the engine 1 and the motor 3, the transmission 4 connected to the output side of the motor 3, an inverter 5 for driving the motor 3, and a battery 6 that is connected to the motor 3 through the inverter 5 to be charged and discharged.

In this configuration, the engine clutch 2 may be selectively locked up or disengaged and may connect or disconnect the engine 1 and the motor 3 to transfer power therebetween.

The inverter 5 may convert direct current (DC) of the battery 6 into three-phase alternating current (AC) and may supply the converted current to the motor 3 in order to drive and control the motor 3.

The transmission 4 may change the power of the motor 3 or the combined power of the engine 1 and the motor 3 and may transfer the changed power to a driving wheel through a driving shaft, and an automatic transmission (AT) or a dual clutch transmission (DCT) may be used as the transmission 4.

In addition, the TMED hybrid system may include a hybrid starter and generator (HSG) 7, which is connected to the engine 1 to transfer power thereto and turns on the engine or generates electricity using rotation power transferred from the engine.

The HSG 7 operates as a motor or a generator and is connected to the engine to always transfer power thereto, and thus may also be used to control an engine speed.

A hybrid electric vehicle including the above system installed therein may travel in an electric vehicle (EV) mode, which is a pure electric vehicle mode for travel using only power of the motor 3, or a hybrid electric vehicle (HEV) mode for travel using power of the engine 1 and power of the motor 3 in combination.

During vehicle braking or coasting using inertia, a regenerative mode of recovering kinetic energy of the vehicle through the motor 3 to charge the battery 6 is executed.

In the regenerative mode, when the kinetic energy of a vehicle is transferred to the motor 3 through a vehicle wheel, the motor 3 may operate as a generator to charge the battery 6 through the inverter 5.

In the hybrid electric vehicle, when a HEV mode switches to an EV mode, engine clutch disengagement control for disconnecting the engine 1 from the motor 3 is performed.

During engine clutch disengagement control, control for reducing impacts due to inertial energy of the engine 1 and the engine clutch 2 is performed together.

Conventionally, when torque input to the engine clutch 2 from a side of the engine 1 is equal to or less than predetermined torque, control for operating an actuator to disengage an engine clutch is performed.

In this case, charge control is performed using the HSG 7 that is connected to the engine 1 to transfer power thereto through a belt or the like in order to reduce the time taken to disengage the engine clutch 2 and increase fuel efficiency.

Here, the HSG 7 may be connected to the engine 1 to transfer power thereto, may perform an integrated function of a starter motor for turning on an engine and a generator for generating electricity using engine power, and may also be referred to as a motor.

However, hereinafter, a motor described separately from the HSG 7 may be referred to as the motor 3 for driving a vehicle; that is, the motor 3 for driving a vehicle is referred to as a 'motor', and the motor 3 and the HSG 7 need to be understood and distinguished from each other.

Figure 3:
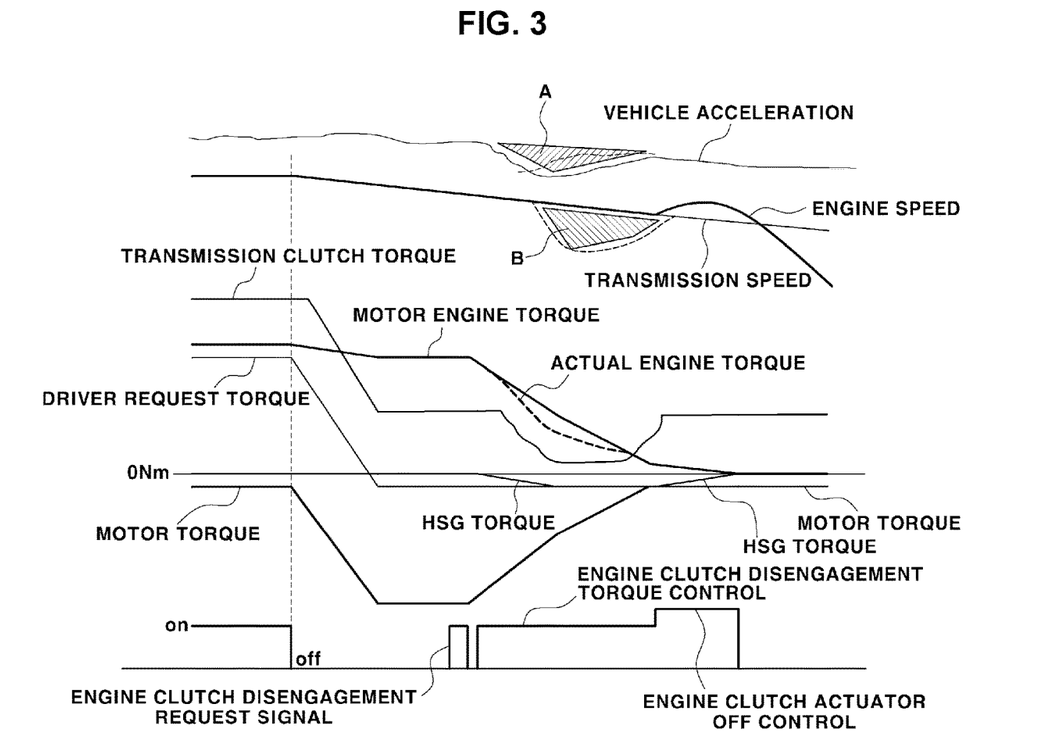
FIG. 3 is a line diagram showing a torque state of an engine clutch disengagement control procedure in one form of the present disclosure.
Figure 4:
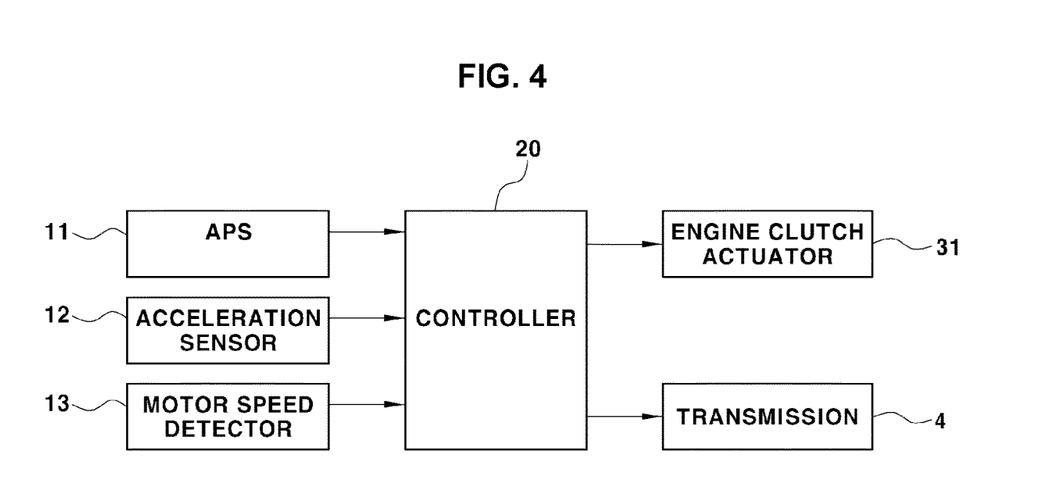
FIG. 4 is a diagram showing the configuration of a system for performing an engine clutch disengagement control procedure in one form of the present disclosure.

FIG. 3 is a line diagram showing a torque state of an engine clutch disengagement control procedure according to the present disclosure. FIG. 4 is a diagram showing the configuration of a system for performing an engine clutch disengagement control procedure according to one form of the present disclosure.

The engine clutch disengagement control procedure according to the present disclosure may be performed under cooperative control of a plurality of controllers, may be performed under cooperative control of controllers such as a hybrid control unit (HCU), which is a high-ranking controller, an engine management system (EMS), a transmission control unit (TCU), or a motor control unit (MCU), or may be performed by a single controller having an integrated function of theses controllers.

Here, the terms, such as 'unit,' 'controller, or 'module', etc., should be understood as a unit that processes at least one function or operation and that may be embodied in a hardware manner (e.g., a processor), a software manner, or a combination of the hardware manner and the software manner.

In the following description, the plurality of in-vehicle controllers for performing cooperative control or the single controller having the integrated function will be collectively referred to as a controller, and the collectively called controller is denoted by reference numeral '20' in FIG. 4.

The engine clutch disengagement control procedure of the hybrid electric vehicle according to the present disclosure may be performed by the controller 20 when a driving mode of the vehicle switches from the HEV mode to the EV mode, an engine clutch actuator 31 may be controlled to disengage the engine clutch 2, and simultaneously, known torque control for disengaging an engine clutch, that is, torque control on the engine 1, the motor 3, and the HSG 7 may be performed by the controller 20.

The engine 1 and the motor 3 may be vehicle driving sources, that is, driving devices for driving the vehicle, which are connected via the engine clutch 2 therebetween, and according to the present disclosure, a control procedure for disengaging the engine clutch 2 may include torque control on the engine 1 and the motor 3, and may also include torque control on the HSG 7 connected to the engine 1 to transfer power thereto.

In the engine clutch disengagement control procedure of the hybrid electric vehicle according to the present disclosure, transmission clutch torque control for inducing transmission clutch slippage as well as torque control on the engine 1, the motor 3, and the HSG 7 may be performed.

The transmission clutch torque control may also be performed by the controller 20, and referring to FIG. 4, the controller 20 may control the clutch torque of the transmission 4.

Like in FIG. 2, FIG. 3 shows model engine torque, actual engine torque, HSG torque, motor torque, transmission clutch torque, and driver request torque as examples of torque.

In FIG. 3, APS on/off indicates an accelerator pedal state and is obtained from a signal of an accelerator position sensor, APS off indicates the state in which a driver takes their foot off an accelerator pedal, and APS on indicates the state in which the driver depresses the accelerator pedal.

In the case of a TMED hybrid system, in FIG. 3, a transmission speed (a rotation speed of an input shaft of a transmission, that is, an input speed of the transmission) may be equal to a motor speed.

As shown in FIG. 3, when an engine clutch disengagement request signal is input after APS off timing, the controller 20, in detail, a hybrid control unit (HCU) among controllers may control torque input to an engine clutch in order to smoothly disengage the engine clutch 2 (which corresponds to an 'engine clutch disengagement torque control' section in FIG. 3).

In this case, control may be performed to make the sum of model engine torque, HSG torque, and motor torque satisfy a driver request torque command until a predetermined torque is reached in consideration of inertial energy of the engine 1 and the engine clutch 2.

Driver request torque may be lowered after APS off, and then, during torque control for disengaging an engine clutch, torque control may be performed to make the sum of model engine torque, HSG torque, and motor torque satisfy driver request torque while engine torque input to the engine clutch 2, that is, the model engine torque in FIG. 3 is gradually reduced.

In FIG. 3, when the model engine torque, which is the torque input to the engine clutch 2 is lowered to predetermined torque, control may be performed to operate the engine clutch actuator 31 to disengage the engine clutch 2 (which corresponds to an 'engine clutch actuator off control' section in FIG. 3).

That is, engine clutch actuator off control moves the engine clutch actuator 31 in a direction in which a clutch is disengaged, and through the engine clutch actuator off control, the engine clutch 2 may be completely disengaged, and thus travel in an EV mode may be possible.

The engine clutch 2 may be disengaged by operating the engine clutch actuator 31 in the section of engine clutch actuator off control, and as a result, power may be disconnected between the engine and the motor, and thus travel in the EV mode may be possible.

As seen from FIG. 3, in a section (the section of engine clutch actuator off control) in which the engine clutch actuator 31 is controlled in a direction in which the clutch is disengaged, an engine speed increases temporarily.

According to the present disclosure, in order to overcome the inaccuracy of engine torque (i.e., an error between model engine torque and actual engine torque occurs), transmission clutch torque control for inducing transmission clutch slippage may be additionally performed.

In this case, as seen from FIG. 3, the controller 20 may perform control for temporarily reducing transmission clutch torque, inducing clutch slippage, and then recovering the torque during torque control for disengaging an engine clutch.

However, as described above, even if transmission clutch torque is temporarily reduced, transmission clutch torque may be controlled to be always larger than transmission input torque (=driver request torque) in order to synchronize the speed of the engine 1 and the motor 3 with the speed of the transmission 4 and to perform driving.

Here, the transmission clutch torque refers to torque responsible by a clutch in the transmission 4, and transmission input torque refers to torque transferred to a transmission input shaft, and is driver request torque, which is the sum of engine torque, HSG torque, and motor torque.

Conventionally, when there is an engine clutch disengagement request, as shown in FIG. 2, transmission clutch torque may be applied to always be higher than transmission input torque (=driver request torque) by a predetermined torque rather than being temporarily reduced irrespective of torque control for disengaging an engine clutch, in particularly, irrespective of occurrence of an error between model engine torque and actual engine torque, thereby preventing a transmission sped from being lowered.

Thus, as seen from FIG. 2, in a torque control section for disengaging an engine clutch, that is, during torque control for the engine 1, the HSG 7, and the motor 3 for disengaging the engine clutch, the engine speed and the motor speed, the transmission speed are the same speed (i.e., slippage does not occur in the transmission clutch).

In contrast, as exemplified in FIG. 3, according to the present disclosure, in a torque control section for disengaging an engine clutch, the controller 20 may perform transmission clutch torque control for reducing transmission clutch torque in order to induce transmission clutch slippage by a target slippage amount obtained based on the difference between actually measured vehicle acceleration and predicted vehicle acceleration.

Thus, referring to FIG. 3, in a torque control section for disengaging an engine clutch, a difference between the engine speed and the transmission speed may occur (refer to region 'B').

That is, during a torque control section for disengaging an engine clutch, the engine clutch 2 is not disengaged, and thus the motor speed and the engine speed are the same, but according to the present disclosure, as transmission clutch torque control is performed, and transmission clutch slippage may occur, and accordingly, unlike the example of FIG. 2, a difference between the engine speed and the motor speed, and the transmission speed may occur, as shown in FIG. 3.

As such, according to the present disclosure, transmission clutch torque control may be performed to induce transmission slippage based on vehicle acceleration information, thereby overcoming a problem that arises during engine clutch disengagement control and preventing the marketability of a vehicle from being degraded.

In a torque control section for disengaging an engine clutch, a difference between the model engine torque and the actual engine torque may occur, and when such a difference occurs, an error between actually measured vehicle acceleration measured by a sensor and acceleration predicted by the controller 20 may occur.

As seen from FIG. 3, a difference between the actually measured vehicle acceleration and the predicted vehicle acceleration may occur.

According to the present disclosure, even if a situation in which model engine torque is inaccurate occurs (a situation in which an error between model engine torque and actual engine torque occurs), transmission clutch torque may be controlled to induce slippage in the transmission clutch based on the actually measured vehicle acceleration and the predicted vehicle acceleration, thereby overcoming a conventional problem in that a driver experiences jerking and vehicle tugging during engine clutch disengagement control and overcoming a problem in terms of degraded marketability of a vehicle.

Figure 5:
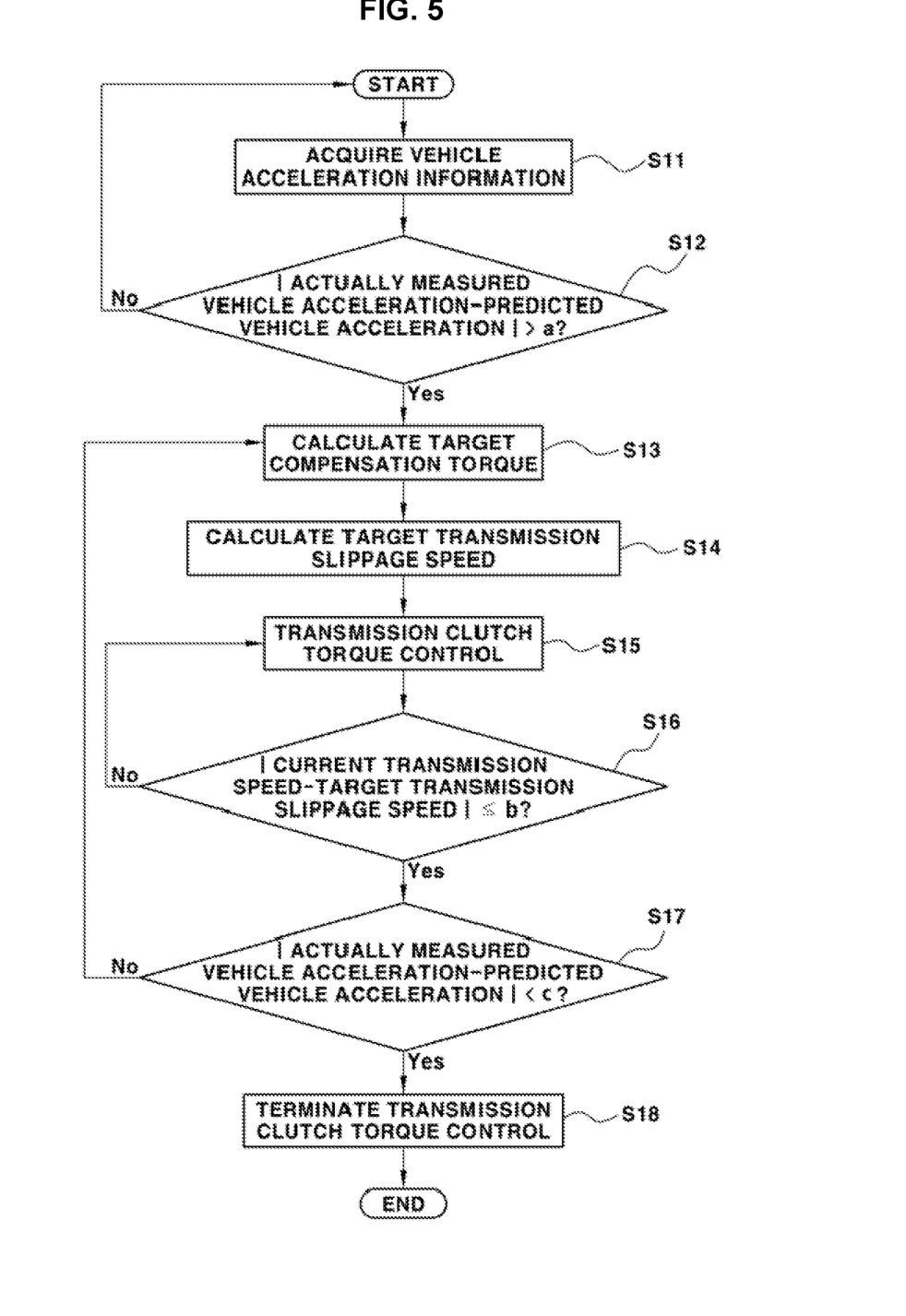
FIG. 5 is a flowchart showing an engine clutch disengagement control procedure in another form of the present disclosure.
Figure 6:
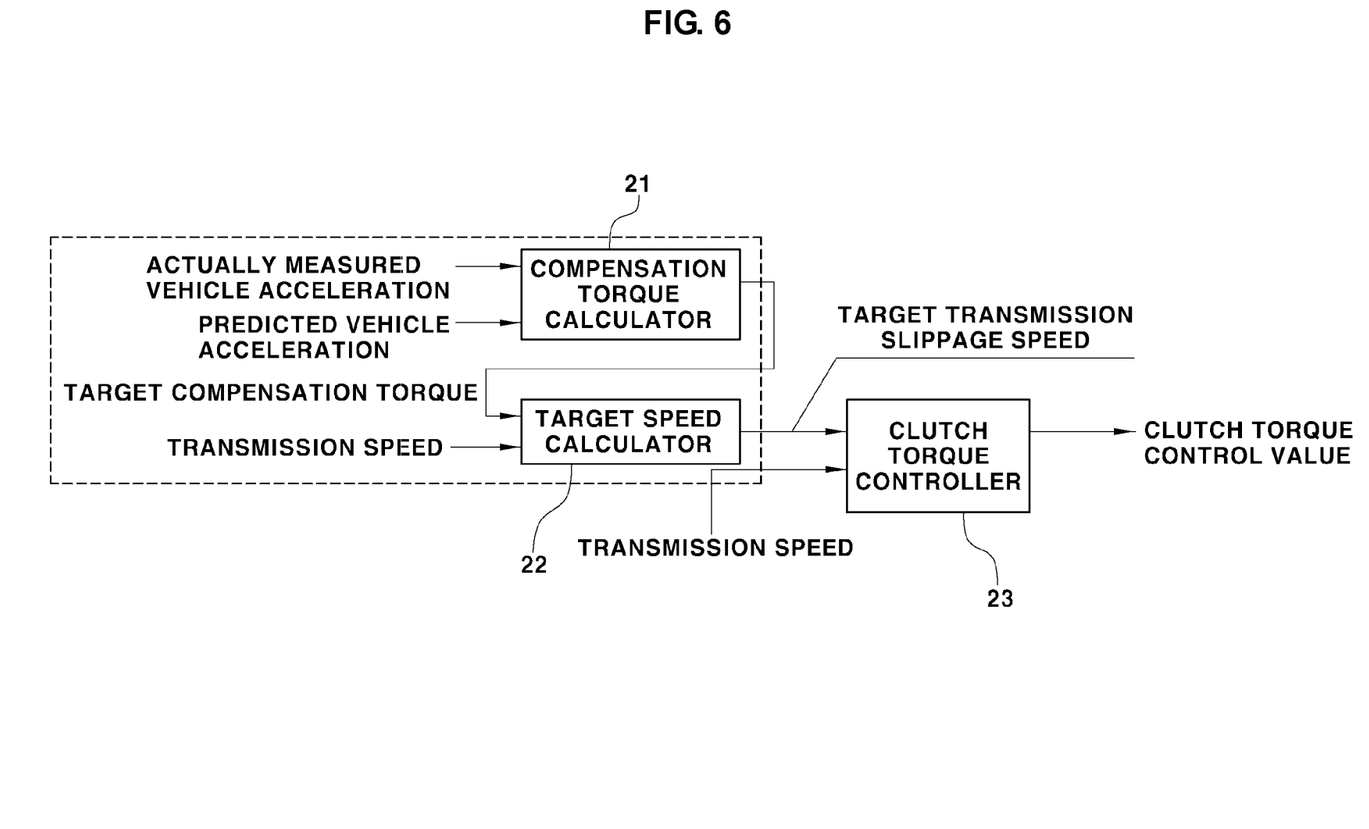
FIG. 6 is a block diagram showing main components in a controller for performing an engine clutch disengagement control procedure in one form of the present disclosure.

FIG. 5 is a flowchart showing an engine clutch disengagement control procedure according to one form of the present disclosure. FIG. 6 is a block diagram showing main components in a controller for performing an engine clutch disengagement control procedure according to one form of the present disclosure.

According to the present disclosure, the controller 20 may determine a situation in which model engine torque is inaccurate during engine clutch disengagement control, that is, a situation in which an error at a predetermined level or greater occurs between the model engine torque and the actual engine torque, based on vehicle acceleration information.

In more detail, according to the present disclosure, the controller 20 may acquire information on vehicle acceleration while a vehicle travels, and in this regard, the actually measured vehicle acceleration may be acquired through an acceleration sensor 12, and simultaneously, the controller 20 may predict vehicle acceleration.

Then, when the predicted vehicle acceleration (hereinafter, referred to as 'predicted vehicle acceleration') and the actually measured vehicle acceleration are compared and an acceleration error, which is the difference therebetween is greater than a setting value (which is a first setting value that will be described later), the controller 20 may determine that an error at a predetermined level or greater occurs between the model engine torque and the actual engine torque.

Here, the actually measured vehicle acceleration is actual vehicle acceleration detected by the acceleration sensor 12 in a vehicle.

According to the present disclosure, the predicted vehicle acceleration may be calculated based on driver request torque, obtained based on driving input information of a driver by the controller 20 while a vehicle travels, vehicle specifications (e.g., a dynamic radius of a tire), driving resistance including a slope resistance, or the like.

Here, the driving input information of the driver may include accelerator pedal state information detected by an accelerator position sensor 11, and acquisition of driver request torque while a hybrid electric vehicle travels is a technology that is known to the art to which the present disclosure pertains, and thus a detailed description thereof is omitted.

Various methods of predicting vehicle acceleration are also known in the art to which the present disclosure pertains, and one of the various known methods may be applied, and furthermore, prediction of vehicle acceleration is also known to the art to which the present disclosure pertains, and accordingly, a detailed description thereof is omitted.

As such, the controller 20 may determine the actually measured vehicle acceleration acquired from a signal of the acceleration sensor 12 as a situation in which model engine torque is inaccurate, based on predicted vehicle acceleration, and when an error between the actually measured vehicle acceleration and the predicted vehicle acceleration is greater than a setting value, the controller 20 may determine a situation in which the model engine torque is inaccurate and a situation in which a condition for performing transmission clutch torque control is satisfied.

According to the present disclosure, the transmission clutch torque may be determined by transmission input torque, and as described above, the transmission input torque may be driver request torque, which is the sum of model engine torque, HSG torque, and motor torque.

According to the present disclosure, the difference between the actually measured vehicle acceleration and the predicted vehicle acceleration may be reduced by torque compensation based on transmission clutch torque control and slippage inducement and improvement in engine torque.

The torque compensation based on transmission clutch torque control and slippage inducement may be determined depending on transmission clutch torque and a slippage amount, and thus the remaining factor except for the transmission clutch torque and the slippage amount may correspond to influence due to an engine torque difference (i.e., a difference between model engine torque and actual engine torque).

According to the present disclosure, when the difference between the predicted vehicle acceleration and the actually measured vehicle acceleration falls within a predetermined range, the inaccuracy of the engine torque may be determined to be overcome, and transmission clutch torque control for inducing transmission clutch slippage may be terminated.

Referring to FIG. 5, first, while a vehicle travels, a controller may acquire vehicle acceleration information, that is, information on predicted vehicle acceleration and actually measured vehicle acceleration (S11).

In this case, the controller 20 may predict vehicle acceleration based on driver request torque, vehicle specifications, driving resistance, or the like, and may acquire actually measured vehicle acceleration from a signal of the accelerator position sensor 11.

When the controller 20 acquires the predicted vehicle acceleration, which is vehicle acceleration predicted while the vehicle travels, and actually measured vehicle acceleration, which is vehicle acceleration detected by the acceleration sensor 12, an acceleration error between the actually measured vehicle acceleration and the predicted vehicle acceleration (=|actually measured vehicle acceleration−predicted vehicle acceleration|) may be obtained, and the obtained acceleration error may be compared with a first setting value 'a' (S12).

Here, when the acceleration error is greater than the first setting value 'a', the current situation may be determined to be a situation in which model engine torque is inaccurate, that is, a situation in which an error between the model engine torque and the actual engine torque is increased to a predetermined level or greater, and then, a control procedure may be performed.

The first setting value 'a' is a threshold value for defining a condition for causing the vehicle acceleration error due to the inaccuracy of the model engine torque.

Then, when the acceleration error is greater than the first setting value, a compensation torque calculator 21 in the controller 20 may calculate and determine target compensation torque $\Delta T$ based on the actually measured vehicle acceleration and the predicted vehicle acceleration, which are vehicle acceleration information (S13).

A target speed calculator 22 in the controller 20 may receive the determined target compensation torque $\Delta T$ and a transmission speed, and may determine a target transmission slippage speed (RPM) based on the received target compensation torque $\Delta T$ and the transmission speed (RPM) (S14).

The compensation torque calculator 21 may calculate the target compensation torque $\Delta T$ using Equation 1 below.

$$\Delta T = (M + Meff) \times \Delta g / r \qquad \text{[Equation 1]:}$$

Here, $\Delta T$ is target compensation torque, M is a weight of a vehicle, Meff is an inertia weight of the vehicle, $\Delta g$ is an acceleration error ($\Delta g$=|actually measured vehicle acceleration−predicted vehicle acceleration|), which is the difference between actually measured vehicle acceleration and predicted vehicle acceleration, and r is a dynamic radius of a tire.

Here, "M," "Meff" and "r" are values known to the compensation torque calculator 21 of the controller 20.

According to Equation 1 above, the compensation torque calculator 21 of the controller 20 may obtain the target compensation torque $\Delta T$, and the target speed calculator 22 of the controller 20 may obtain a target slippage amount $\Delta$RPM from the obtained target compensation torque $\Delta T$ using Equation 2 below.

$$\Delta T = I_{PT} \times \Delta \text{RPM} \qquad \text{[Equation 2]:}$$

Here, $\Delta$RPM is a target slippage amount, $I_{PT}$ is the rotational inertia of an input shaft of a transmission, and the rotational inertia $I_{PT}$ of the input shaft of the transmission is kwon to the controller.

As a result, according to Equation 2, the target slippage amount $\Delta$RPM may be obtained from the target compensation torque $\Delta T$ calculated using Equation 1 above, and when the target speed calculator 22 of the controller 20 obtains the target slippage amount $\Delta$RPM, a target transmission slippage speed may be calculated from the current transmission speed and the target slippage amount.

According to the present disclosure, the target slippage amount $\Delta$RPM may be a difference between the transmission speed and the target transmission slippage speed, and thus the target transmission slippage speed may be calculated from the target slippage amount $\Delta$RPM and the transmission speed.

As described above, when the target speed calculator 22 of the transmission obtains the target transmission slippage speed, the obtained target transmission slippage speed may be input to a clutch torque controller 23 of the controller 20.

The clutch torque controller 23 of the controller 20 may perform transmission clutch torque control for inducing slippage in the transmission clutch based on the current transmission speed and the target transmission slippage speed (S15).

In this case, the clutch torque controller 23 of the controller 20 may control transmission clutch torque to make the current transmission speed reach the target transmission slippage speed.

In more detail, the clutch torque controller 23 of the controller 20 may determine a transmission clutch torque control value for making the current transmission speed reach the target slippage speed, and may then generate and output a control signal corresponding to the determined transmission clutch torque control value.

Thus, clutch torque of the transmission 4 may be controlled depending on the control signal that is generated and output by the clutch torque controller 23.

During the above transmission clutch torque control, the controller 20 may compare a difference between the current transmission speed and the target transmission slippage speed (=|current transmission speed−target transmission slippage speed|) with a predetermined speed error setting value, that is, a second setting value 'b' (S16).

Here, when the difference between the current transmission speed and the target transmission slippage speed is equal to or less than the second setting value 'b', the controller 20 may store the current transmission clutch torque value and the target slippage amount as learned values, and may then compare the difference between the actually measured vehicle acceleration and the predicted vehicle acceleration with a predetermined acceleration error setting value, that is, a third setting value 'c' (S17).

When the difference between the actually measured vehicle acceleration and the predicted vehicle acceleration is smaller than the third setting value 'c', the problem due to the inaccuracy of model engine torque during engine clutch disengagement control may be determined to be overcome, and transmission clutch torque control may be terminated (S18).

According to the present disclosure, the second setting value 'b' is a setting value for defining a condition for determining whether the target slippage amount is satisfied during transmission clutch torque control, and the third setting value 'c' is a setting value for defining a condition for determining the timing of overcoming vehicle acceleration and overcoming the inaccuracy of engine torque after transmission slippage compensation control, i.e., the transmission clutch torque control.

Thus far, the method of engine clutch disengagement control according to the present disclosure has been described in detail, and according to the present disclosure, in order to induce the transmission clutch slippage during engine clutch disengagement control, compensation torque for compensating for the difference between the actually measured vehicle acceleration and the predicted vehicle acceleration may be calculated and obtained, a target slippage amount for overcoming a problem in terms of vehicle acceleration may be determined based on the obtained compensation torque, and then, transmission clutch torque (transmission clutch input torque) control for controlling the current transmission speed (transmission input speed) to the transmission clutch target slippage speed may be performed based on the determined target slippage amount.

As such, when the transmission clutch torque is controlled to lower the allowable torque of the transmission clutch, target slippage may occur in the transmission.

During the above clutch torque control procedure for the transmission clutch slippage, transmission clutch torque may be reduced to a predetermined level or less depending on a control signal output by the clutch torque controller 23 of the controller 20, as exemplified in FIG. 3.

As exemplified in FIG. 3, when the transmission speed reaches a target transmission speed (target slippage speed of the transmission), the controller 20 may maintain constant transmission clutch torque.

According to the present disclosure, the target speed calculator 22 and the clutch torque controller 23 of the controller 20 may receive the current transmission speed as a feedback signal and may perform feedback control on the transmission clutch torque to make the transmission speed be maintained as the target slippage speed of the transmission.

As described above, the controller may learn the transmission clutch torque value and the target slippage amount during a control procedure, and may then apply the learned torque to the transmission clutch torque with a predetermined ratio during feedback control to rapidly perform control.

Although the case in which vehicle acceleration detected by the acceleration sensor is used has been described, information on a wheel speed detected by a wheel speed sensor may be used alone without vehicle acceleration information, and it may be possible to predict a slope and vehicle acceleration using the wheel speed information.

Before the actually measured vehicle acceleration and the predicted vehicle acceleration are compared when the inaccuracy of the engine torque is determined, prediction and determination may be possible using a leaning value of transmission clutch torque control.

Feedback control may not be performed on clutch torque based on a slippage amount during a transmission clutch torque control procedure for inducing slippage in the transmission clutch, but instead, feedforward control may be performed based on the target transmission slippage speed.

It may be possible to store a learned value in consideration of the influence of each transmission end, each transmission speed, each engine torque, and environmental conditions (outdoor temperature, cooling water temperature, and intake air temperature), but not a clutch torque value based on a target slippage amount, as a learning factor of transmission clutch torque control.

Accordingly, in the engine clutch disengagement control method for a hybrid electric vehicle according to the present disclosure, even if the situation in which model engine torque is inaccurate occurs (a situation in which an error between model engine torque and actual engine torque occurs), transmission clutch torque may be controlled to induce slippage in the transmission clutch based on the actually measured vehicle acceleration and the predicted vehicle acceleration, thereby overcoming a conventional problem in that a driver experiences jerking and vehicle tugging during engine clutch disengagement control and overcoming a problem in terms of degraded marketability of a vehicle.

According to the present disclosure, an effect of improving marketability by providing the accuracy of engine clutch disengagement control as well as an effect of increasing fuel efficiency may be expected.

A technology of controlling a transmission clutch that is robust to engine torque disturbance may be ensured using a learned value at timing of disengagement of an engine clutch through transmission clutch torque control for slippage in the transmission clutch.

In addition, the accuracy of transmission clutch control may be enhanced in response to engine torque disturbance, and thus, improved gear-shifting sensations may also be expected.

The present disclosure has been described in detail with reference to exemplary forms thereof. However, it will be appreciated by those skilled in the art that changes may be made in these forms without departing from the principles and spirit of the present disclosure.

What is claimed is:

1. An engine clutch disengagement control method for a hybrid electric vehicle, the method comprising:
    acquiring, by a controller, vehicle acceleration information during engine clutch disengagement control of the hybrid electric vehicle;
    determining, by the controller, whether a predetermined condition for determining inaccuracy of a model engine torque required for an engine clutch disengagement control is satisfied based on the acquired vehicle acceleration information;
    when the predetermined condition is satisfied, determining, by the controller, a situation in which the model engine torque is inaccurate, and calculating a target compensation torque using the vehicle acceleration information;
    calculating, by the controller, a target slippage amount in a transmission clutch using the calculated target compensation torque; and performing, by the controller, a transmission clutch torque control for inducing slippage in the transmission clutch based on the calculated target slippage amount and a current transmission speed.

2. The method of claim 1, wherein the vehicle acceleration information includes:
   a measured vehicle acceleration detected by an acceleration sensor; and
   a predicted vehicle acceleration calculated by the controller.

3. The method of claim 2, wherein the controller is configured to:
   determine the predetermined condition as a condition in which an acceleration error is greater than a predetermined first setting value, where the acceleration error corresponds to a difference between the measured vehicle acceleration and the predicted vehicle acceleration.

4. The method of claim 2, wherein the predicted vehicle acceleration is calculated by the controller based on a driver request torque, vehicle specifications, and a driving resistance.

5. The method of claim 2, wherein the target compensation torque is calculated by the controller based on a weight of the hybrid electric vehicle, an inertia weight of the hybrid electric vehicle, a dynamic radius of a tire, and an acceleration error, wherein the acceleration error is a difference between the measured vehicle acceleration and the predicted vehicle acceleration.

6. The method of claim 1, wherein the target slippage amount is calculated by the controller based on the calculated target compensation torque and a rotational inertia of an input shaft of a transmission of the hybrid electric vehicle.

7. The method of claim 1, wherein performing the transmission clutch torque control includes:
   calculating a target transmission slippage speed based on the calculated target slippage amount and the current transmission speed, and
   performing the transmission clutch torque control for making the current transmission speed reach the calculated target transmission slippage speed.

8. The method of claim 7, wherein the controller is configured to:
   receive the current transmission speed as a feedback signal, and
   perform a feedback control on a transmission clutch torque to make the current transmission speed reach the target transmission slippage speed.

9. The method of claim 7, wherein, while the transmission clutch torque control is performed, when a difference between the current transmission speed and the calculated target transmission slippage speed is equal to or less than a predetermined speed error setpoint, the controller is configured to store a transmission clutch torque value and the target slippage amount as learned values.

10. The method of claim 7, wherein:
   while the transmission clutch torque control is performed, the controller is configured to determine whether a speed difference between the current transmission speed and the calculated target transmission slippage speed is equal to or less than a predetermined speed error setpoint;
   when the speed difference is equal to or less than the predetermined speed error setpoint, the controller is configured to determine whether an acceleration difference between an actually measured vehicle acceleration detected by an acceleration sensor and a predicted vehicle acceleration calculated by the controller, is equal to or less than a predetermined acceleration error setpoint; and
   when the acceleration difference is equal to or less than the predetermined acceleration error setpoint, the controller is configured to terminate the transmission clutch torque control.

* * * * *